United States Patent [19]
Dunstan

[11] 4,366,786
[45] Jan. 4, 1983

[54] RECIPROCARINT PISTON INTERNAL COMBUSTION ENGINE

[76] Inventor: Lyle A. Dunstan, 5105 NW. 137th Ave., Portland, Oreg. 97229

[21] Appl. No.: 222,291

[22] Filed: Jan. 5, 1981

[51] Int. Cl.³ .................... F02M 17/00; F02B 75/26
[52] U.S. Cl. .......................... 123/179 F; 123/58 BA; 123/DIG. 9
[58] Field of Search ............. 123/58 R, 58 A, 58 BA, 123/179 F, DIG. 9

[56] References Cited

U.S. PATENT DOCUMENTS

| | | | |
|---|---|---|---|
| 1,255,973 | 2/1918 | Almen | 123/58 BA |
| 1,276,351 | 8/1918 | Halsey | 123/DIG. 9 |
| 1,774,713 | 9/1930 | Jahn et al. | 123/58 R |
| 1,937,077 | 11/1933 | West | 123/58 BA |
| 2,042,730 | 6/1936 | Redrup | 123/58 BA |
| 3,032,965 | 5/1962 | Wistner | 123/179 F |
| 4,090,478 | 5/1978 | Trimble et al. | 123/58 B |

*Primary Examiner*—Craig R. Feinberg
*Attorney, Agent, or Firm*—Oliver D. Olson

[57] ABSTRACT

An internal combustion engine includes a plurality of cylinders each containing a reciprocative piston connected to an output rotary power shaft. The cylinders communicate with a common fuel chamber sequentially through a rotary distribution valve driven by the output power shaft.

Starting of the engine is achieved by delivering gaseous fluid to the fuel chamber and thence through the distribution valve to a cylinder under pressure sufficient to drive the piston inward in a power stroke. Combustible fuel is delivered to the fuel chamber at a pressure greater than cylinder combustion pressure, and combustion air is delivered to each cylinder from a source of external air under pressure through an inlet port which is opened and closed by the associated piston adjacent the bottom of the stroke thereof.

Some of the hot gases of combustion in each cylinder are delivered back to the fuel chamber through the distribution valve at a temperature above the ignition temperature of the fuel and at a pressure above the compression pressure of the cylinder. When the distribution valve communicates the fuel chamber with the next succeeding cylinder in the operating sequence, the rich fuel mixture in the fuel chamber is delivered to said cylinder where it mixes with combustion air and is ignited, driving the associated piston inward to effect a second power stroke.

11 Claims, 6 Drawing Figures

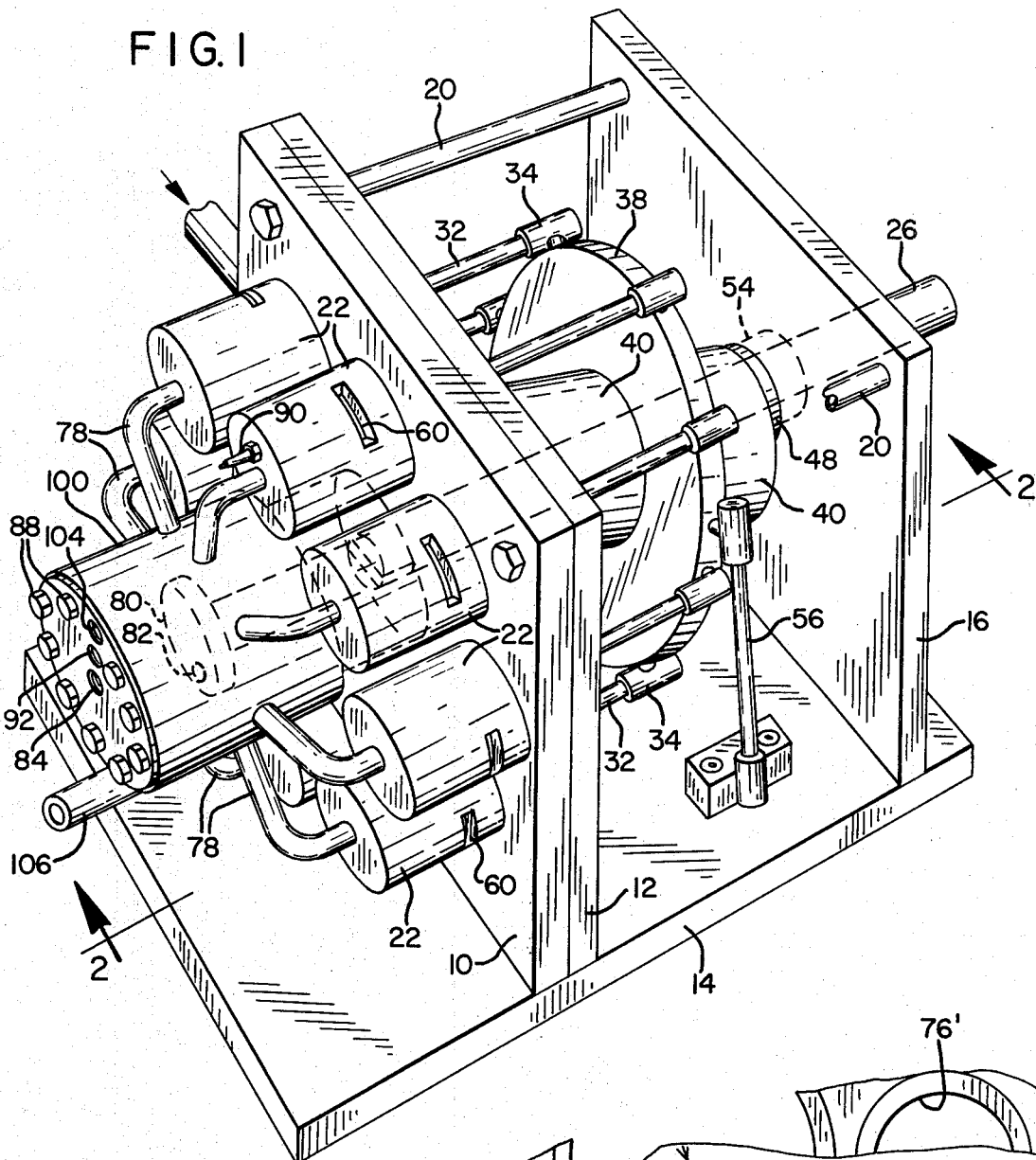
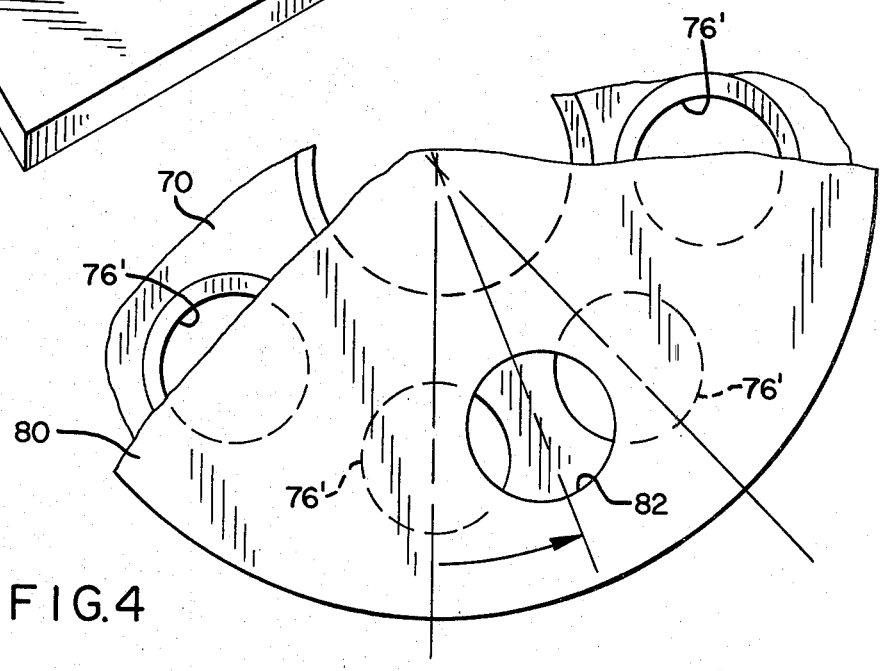

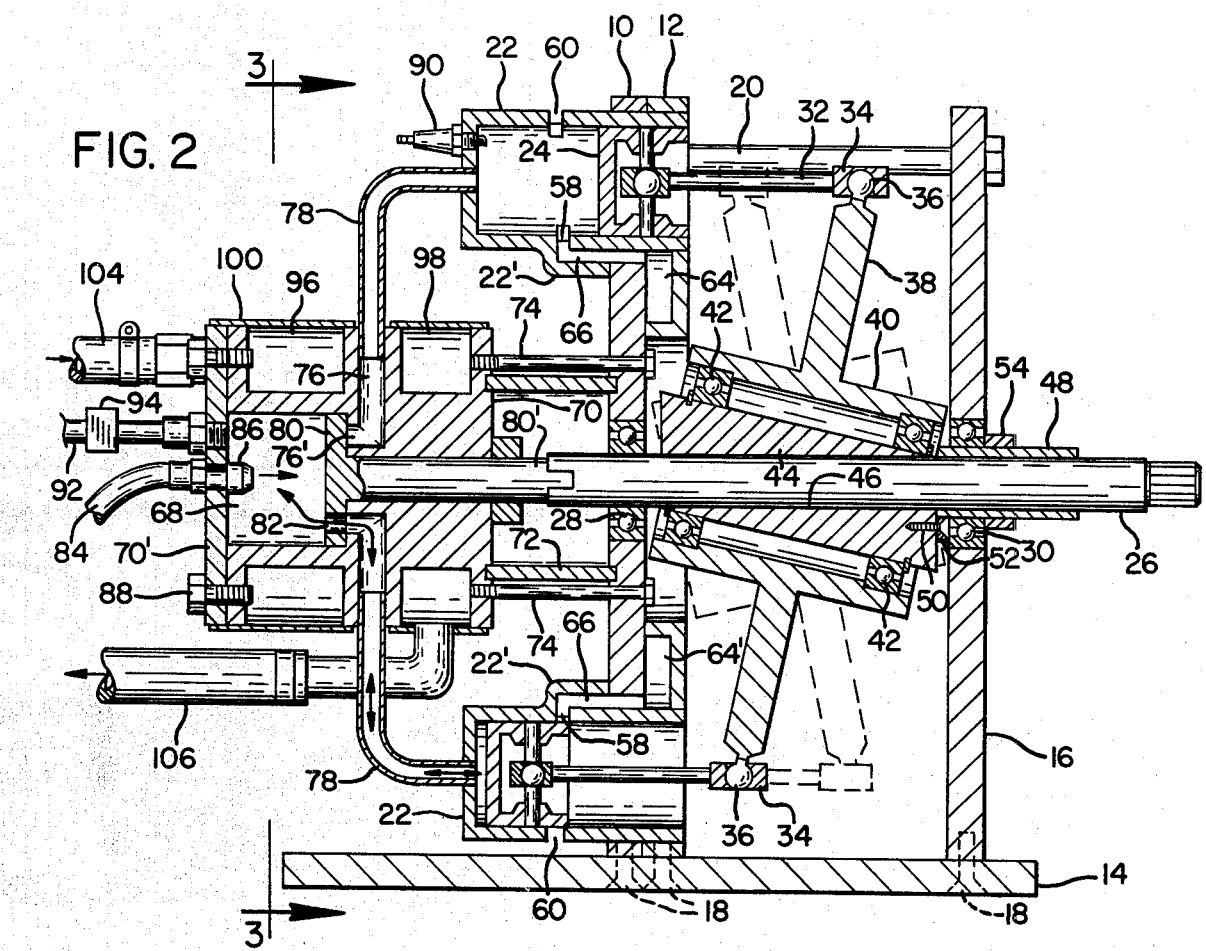

RECIPROCARINT PISTON INTERNAL COMBUSTION ENGINE

BACKGROUND OF THE INVENTION

This invention relates to internal combustion engines, and more particularly to an internal combustion engine of the reciprocating piston type but which need not have crank starting, which is devoid of timed ignition or timed fuel injection for substained operation and which operates on excess combustion air.

Conventional reciprocating piston type gasoline engines require timed ignition, synchronized to the compression stroke of each piston, and also require precision mixing of fuel and combustion air. They also require manual or electrically driven cranking for starting. Conventional diesel engines require timed fuel injection.

SUMMARY OF THE INVENTION

In its basic concept, this invention provides an internal combustion engine of the reciprocating piston type in which a portion of the hot gases of combustion in the cylinder is delivered to the same or next succeeding cylinder in the operating sequence, together with combustible fuel, at a temperature exceeding the ignition temperature of the fuel and at a pressure exceeding the combustion pressure of the cylinder.

The principal objective of this invention is to provide an internal combustion engine of the reciprocating piston type which requires no timed ignition for sustained operation, no precise mixing of fuel and air, and no timed injection of fuel.

Another object of this invention is to provide an internal combustion engine of the reciprocating piston type which performs at high efficiency by operating an excess combustion air.

A further object of this invention is to provide an internal combustion engine of the multiple cylinder reciprocating piston type in which the sequence of operation of the cylinders is reversible.

Still another object of this invention is to provide an internal combustion engine of the reciprocating piston type in which air or steam under pressure may be employed for starting the engine, in which case the engine may produce full torque from zero r.p.m. to full speed.

A still further object of this invention is to provide an internal combustion engine of the reciprocating piston type in which electric ignition is used only for starting.

The foregoing and other objects or advantages of this invention will appear from the following detailed description taken in connection with the accompanying drawings of a preferred embodiment.

BRIEF DESCRIPTION OF THE DRAWINGS

FIG. 1 is a perspective view in schematic form of an internal combustion engine embodying the features of this invention.

FIG. 2 is a fragmentary longitudinal vertical section taken on the line 2—2 in FIG. 1.

FIG. 3 is a fragmentary transverse vertical section taken on the line 3—3 in FIG. 2.

FIG. 4 is a fragmentary vertical elevation, on an enlarged scale, of a modification of the distribution valve shown in FIG. 3.

DESCRIPTION OF THE PREFERRED EMBODIMENT

Figure 5:
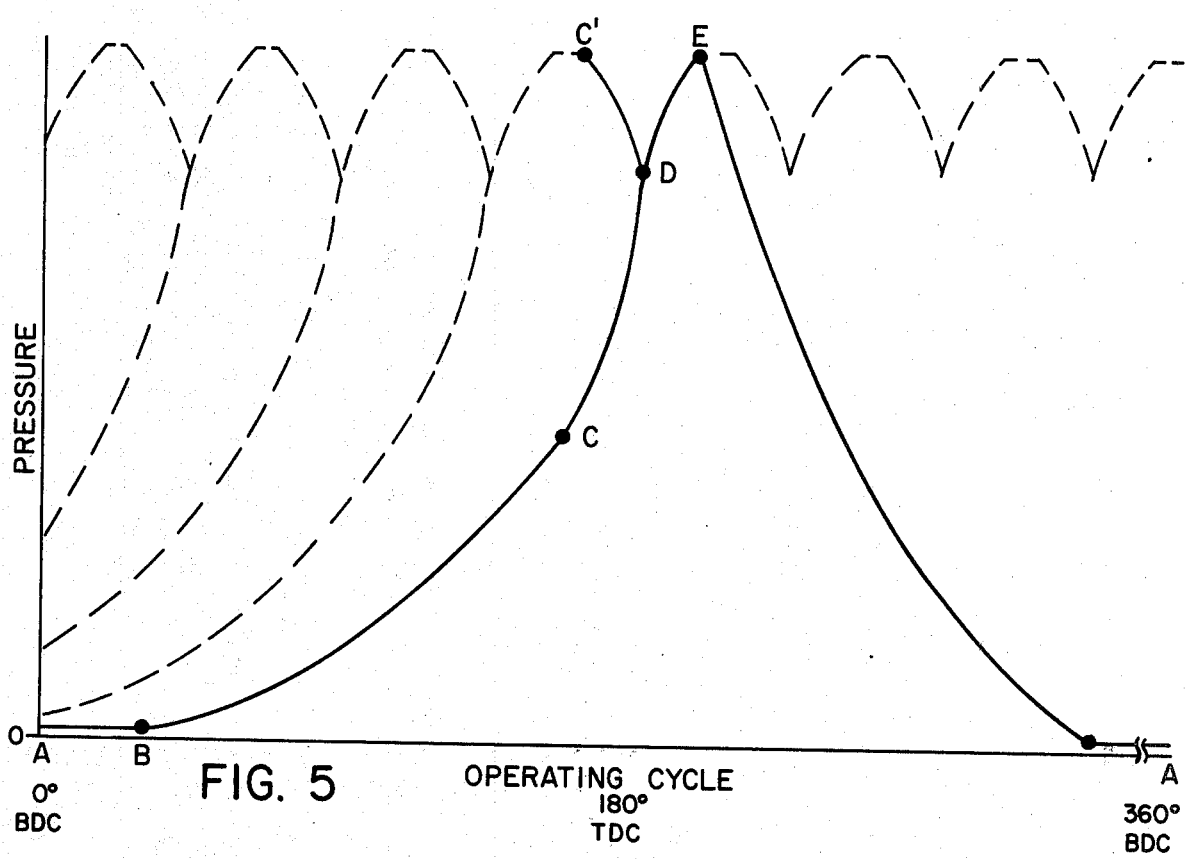
FIG. 5 is a graphic representation of the relative pressures within the fuel chamber and one of the cylinders of the two stroke engine of FIG. 1 during one operating cycle, lines A B C D E F A representing pressure within a cylinder and lines C' D E representing pressure within the fuel chamber.

In this invention an addition to conventional cycles is employed wherein the cylinder is ported to a "fuel chamber" toward the end of the compression stroke, and prior to the power stroke. The pressure in the fuel chamber is higher than compression pressure, but less than combustion pressure. Initially, in the added cycle the higher pressure in the fuel chamber will force a mixture of fuel and hot gases, too rich to burn, into the cylinder where it will burn in the compressed fresh air. The pressure in the cylinder will then raise above the pressure in the fuel chamber so that a portion of the gases will flow from the cylinder back into the fuel chamber, thus restoring the pressure and temperature in that chamber. The port between fuel chamber and cylinder then closes and a normal power stroke ensues. This additional cycle may be applied to either two-stroke or four-stroke engines of either diesel or gasoline type.

The engine illustrated includes an engine base made up of a plurality of plates. A pair of plates 10 and 12 are secured together in face-abutting relationship and are secured to a horizontal base plate 14 and a vertical back plate 16, as by screws 18 and spacer bolts 20.

A plurality of combustion cylinders 22 are mounted on the plates 10 and 12, extending through registering openings in said plates. There are eight such cylinders illustrated, although any number may be utilized. Although the cylinders may be arranged in an in-line manner, the eight illustrated are spaced apart at equal circumferential intervals about a common central axis. The bottom of each cylinder extends through the plates 10 and 12 and is open, while the top is closed by a cylinder head. A piston 24 is reciprocative in each cylinder between top and bottom power stroke positions.

The pistons are operatively connected to an output rotary power shaft 26 by means which converts the reciprocative movement of the pistons to rotary motion of the power shaft. In the embodiment illustrated, the output power shaft is mounted for axial rotation on the common central axis of the cylinders 22. It extends through bearings 28 and 30 mounted in openings in the plates 10 and 16.

Pistons rods 32 extend rearwardly from the pistons, through the open bottom ends of the cylinders, and are connected by universal pivot sockets 34 to pivot balls 36 radiating outwardly from a swash plate 38. The pivot balls are spaced apart circumferentially to match the spacing of the cylinders.

The central hollow hub 40 of the swash plate is fitted with bearings 42 which mount an eccentric axle 44 for rotation relative to the hub. A bore 46 extends through the axle at an oblique angle relative to the longitudinal center of the axle and hub, and the bore receives the output power shaft 26 therethrough. A rearward extension 48 of the axle 44, secured thereto by screws 50 through a radial flange 52, extends through the bearing 30.

A clamp band 54 is shown to surround a rearward split portion of extension 38. It is operable to releasably secure the axle and power shaft together for simultaneous rotation. The clamp band also serves to illustrate means by which to adjust the operational phasing of the engine, as described hereinafter.

It will be recognized that sequential reciprocation of the pistons in a circular pattern causes the swash plate to oscillate in a corresponding pattern. This motion results in rotation of the axle 44 and the output power shaft 26 secured thereto.

An anti-torque arm 56 is secured at one end pivotally to the swash plate, by a radial pivot ball on the swash plate and a pivot socket on the arm, and at the opposite end pivotally to the engine base plate 14 by a similar ball and socket coupling. This arm prevents rotation of the swash plate with rotation of the axle 44. It also substantially eliminates side thrust and resulting friction of the pistons which is present in conventional crankshaft configurations.

If desired, a second swash plate assembly may be mounted on the output shaft 26, angled in opposition to the assembly illustrated in order to minimize vibration.

As illustrated, each piston-cylinder unit is arranged to operate in the two cycle mode. Thus, there is a combustion air inlet port 58 and a combustion gases exhaust port 60 in each cylinder. Both of these ports are located adjacent the bottom power stroke position of the associated piston (FIG. 2), so that they are opened substantially simultaneously (the inlet port opens slightly later than the exhaust port) by the piston when the latter reaches the bottom of its power stroke and they are closed substantially simultaneously by the piston during the compression stroke and power stroke.

Combustion air under superatmospheric pressure is supplied to the cylinders from a source of atmospheric air, by such means as an air blower (not shown) communicating with an air conduit 62. This conduit communicates with an annular manifold chamber 64 formed in the plate 12. Passageways 66 extend from the manifold chamber, through the plate 10 and offset portions 22' of the cylinders to the combustion air ports 58.

The exhaust ports 60 are shown communicating directly with the atmosphere. If desired, they may be coupled to an annular exhaust manifold chamber (not shown).

In accordance with this invention, combustible fuel, such as gasoline, diesel oil, propane and others, is supplied to the cylinders from a common fuel chamber 68. In the embodiment illustrated, this chamber is formed in a housing 70 which is mounted on the engine plate 10 by spacer ring 72 and clamp bolts 74. The common central longitudinal axis of the fuel chamber and housing is disposed on the rotational axis of the output power shaft 26.

Fuel passageways are provided for communicating the fuel chamber 68 with the cylinders 22. As illustrated, each of the passageway is formed by a bore 76 in the housing and a length of conduit 78 extending from the bore to the associated cylinder, at the head end of the latter. The concentric arrangement of the housing and cylinders contribute advantageously to fuel passageways of uniform and minimum length. This assures maximum and uniform speed of transfer of gaseous fluid between the fuel chamber and cylinders, and minimum loss of heat.

Means is provided for distributing combustible fuel from the fuel chamber 68 to the cylinders on a sequential pattern. As illustrated, this means is provided by a rotary disc 80 in the fuel chamber. The shaft 80' of the disc is mounted for rotation in a central longitudinal bore in the housing 70 and is coupled to the output rotary power shaft 26 as by a spline connection. A fuel distribution port 82 in the disc, offset radially from its axis of rotation, is arranged to register sequentially with the adjacent ends of the fuel passageway bores 76 which are spaced apart circumferentially about the axis of rotation of the disc.

In the embodiment illustrated in FIG. 3, the ends 76' of the bore 76 are spaced apart circumferentially a distance greater than the diameter of the port 82. Accordingly, the fuel chamber 68 communicates with only one cylinder at a time. In FIG. 4 the ends 76' of the bores are spaced apart circumferentially a distance less than the diameter of the port 82. Thus, there are increments of time during which the fuel chamber communicates with adjacent pairs of cylinders during rotation of the disc 80. It has been found that this arrangement contributes beneficially to smoother operation of the engine.

Combustible fuel is delivered to the fuel chamber 68 from a source (not shown) through a fuel supply conduit 84 and nozzle 86 mounted removably in the front wall 70' of the housing. As illustrated, this wall is rendered removable by the attachment bolts 88. For reasons which will become apparent hereinafter, the combustible fuel is delivered to the fuel chamber at a constant rate in proportion to the desired power and at a superatmospheric pressure that is greater than the combustion pressure within the cylinder. Also as explained hereinafter, the fuel delivered to the fuel chamber becomes heated to a temperature exceeding its ignition temperature. However, since it is an extremely rich mixture substantially devoid of combustion air, it does not ignite in the fuel chamber. Rather, the rich mixture is delivered to each cylinder sequentially through the distribution port 82. In each cylinder the rich mixture is combined with excess combustion air supplied through port 58 at the bottom of the power stroke of the piston. This mixture is ignited, initially with the aid of an electric spark or glow plug 90.

In this regard, a single spark or glow plug in a single cylinder, as shown for simplicity, is all that is needed to initiate fuel combustion. However, the port 82 may be in registry with any one of the cylinders before start, and therefore it is preferred that a plug be provided for each cylinder.

It will be understood, however, that initial as well as subsequent ignition of the fuel and air mixture may be achieved simply by the superatmospheric pressure developed during the compression stroke of the cylinder, if such pressure is sufficient for the purpose.

In general, the engine of this invention is started by rotating the power shaft (cranking), supplying starting fluid to the fuel chamber to bring the pressure to a level higher than compression pressure, pumping fuel into the fuel chamber, and providing means to ignite the fuel in the chamber by means of spark, glow plug, or compression temperature. The starting fluid may be compressed air, steam, or other gas and may serve the dual function of supplying cranking torque as well as pressurizing the fuel chamber. This means of cranking may supply full load torque from zero r.p.m. up to running speed.

In the illustrated embodiment, cranking of the engine is accomplished by introducing a gaseous starting fluid, such as air, steam, or other gas, into one or more of the cylinders, sequentially, when the associated piston is at substantially top power stroke position. Accordingly, the starting fluid is admitted to the cylinder at a superatmospheric pressure, higher than cylinder compression pressure, sufficient to drive the piston inward toward its bottom power stroke position.

In the embodiment illustrated, a source (not shown) of air, steam, or other suitable gaseous starting fluid is fed to the fuel chamber 68 through a supply conduit 92. A check valve 94 in the conduit functions to permit fluid flow only toward the fuel chamber, whereby to prevent blow-back and to prevent dissipation of high pressure in the fuel chamber.

Since hot gases of combustion in the cylinders are fed back into the fuel chamber 68, the housing 70 is provided with a cooling system. As illustrated, a pair of longitudinally spaced annular cooling chamber 96 and 98 are formed in the housing by annular grooves and a surrounding outer wall 100. The cooling chambers are interconnected by a plurality of circumferentially spaced openings 102 in the housing (FIG. 3). Water or other coolant liquid is circulated through the chambers by means of coolant tubes 104 and 106.

The operation of the engine described hereinbefore is as follows: A key-operated start switch in an electric circuit is closed to activate the spark or glow plugs 90 and also to activate a solenoid shut-off valve in the starting fluid conduit 92 to open said conduit and admit starting fluid under pressure to the fuel chamber 68. Combustible fuel also is delivered to the fuel chamber through supply conduit 84.

The pressurized gaseous starting fluid, together with combustible fuel, is delivered from the fuel chamber 68 through the distribution port 82 in valve disc 80 to the registering cylinder, driving the piston toward its bottom power stroke position. At slightly past top dead center of the piston, the port 82 closes. When the piston reaches its bottom power stroke position, the exhaust port opens and, slightly later, combustion air is injected, at slightly superatmospheric pressure, into the cylinder through the inlet port 58. This is illustrated in FIG. 5 by the line A-B. The piston then moves in its compression stroke toward its top power stroke position, compressing the mixture of combustible fuel, starting fluid and excess combustion air ahead of it. This is illustrated by line B-D in FIG. 5. From C to E the port 82 is open, and from C' to D the hot air and fuel mixture flows from the fuel chamber 68 into the cylinder where it begins to burn. The pressure in the fuel chamber decreases until, at point D, it matches the combustion pressure in the cylinder. The cylinder pressure continues to increase, from D to E as the mixture continues to burn. At point E the temperature and pressure in the fuel chamber have been restored. The expanding gases of combustion drive the piston toward its bottom power stroke position. This is illustrated by line E-F in FIG. 5. Upon reaching this latter position some of the spent gases of combustion are exhausted through port 60, as illustrated by line F-A in FIG. 5.

Since the port 82 is open from C to E, some of the hot gases of combustion also are delivered back through the distribution port 82 into the fuel chamber 68. These gases are above the ignition temperature of the combustible fuel and are also at substantially the superatmospheric pressure of combustion within the cylinder, as indicated by line D-E in FIG. 5. It is because of this high pressure that the fuel supply must be pressurized to a greater magnitude and the check valve 94 must prevent blow-back in the starting fluid supply conduit 92.

From C' to D the hot, highly pressurized gases of combustion thus contained in the fuel chamber 68 are there mixed with combustible fuel and delivered to the next succeeding cylinder 22 in the operating sequence established by the rotary distribution valve disc 80. This delivery of fuelrich mixture is at a pressure sufficient to drive the associated piston toward its bottom power stroke position. The fuel rich mixture mixes with excess combustion air in the cylinder 22 and begins to burn. From C' to D the pressure in the fuel chamber 68 decreases until, at point D, it matches the combustion pressure in the cylinder. As previously explained, the cylinder pressure increases from D to E, whereupon the temperature and pressure in the fuel chamber have been restored. At E the port 82 closes and the power expansion cycle ensues. After exhaust, combustion air is injected into the cylinder and the mixture compressed by return of the piston in its compression stroke to its maximum compression position.

Since the compressed mixture of hot gases of combustion, fuel and combustion air is above the ignition temperature of the fuel, ignition now occurs without assist from electric spark. Accordingly, the electrical circuit for the spark plugs 90 now may be opened. Also, since the engine now operates by combustion, the starting fluid system is turned off, and starting fluid is replaced by hot gases of combustion for subsequent cycles of operation.

The foregoing operating mode continues sequentially and repetitively for each cylinder for as long as it is desired to operate the engine. Output power at shaft 26 is controlled by the rate of delivery of combustible fuel to the fuel chamber 68.

Although the isolated arrangement of distribution port 82 and bores 76 in FIG. 3 produces satisfactory engine operation, smoother operation is believed to be achieved by the overlapping arrangement of FIG. 4, since the hot gases of combustion from a preceding cylinder are delivered more quickly and uniformly to the next succeeding cylinder.

Figure 6:
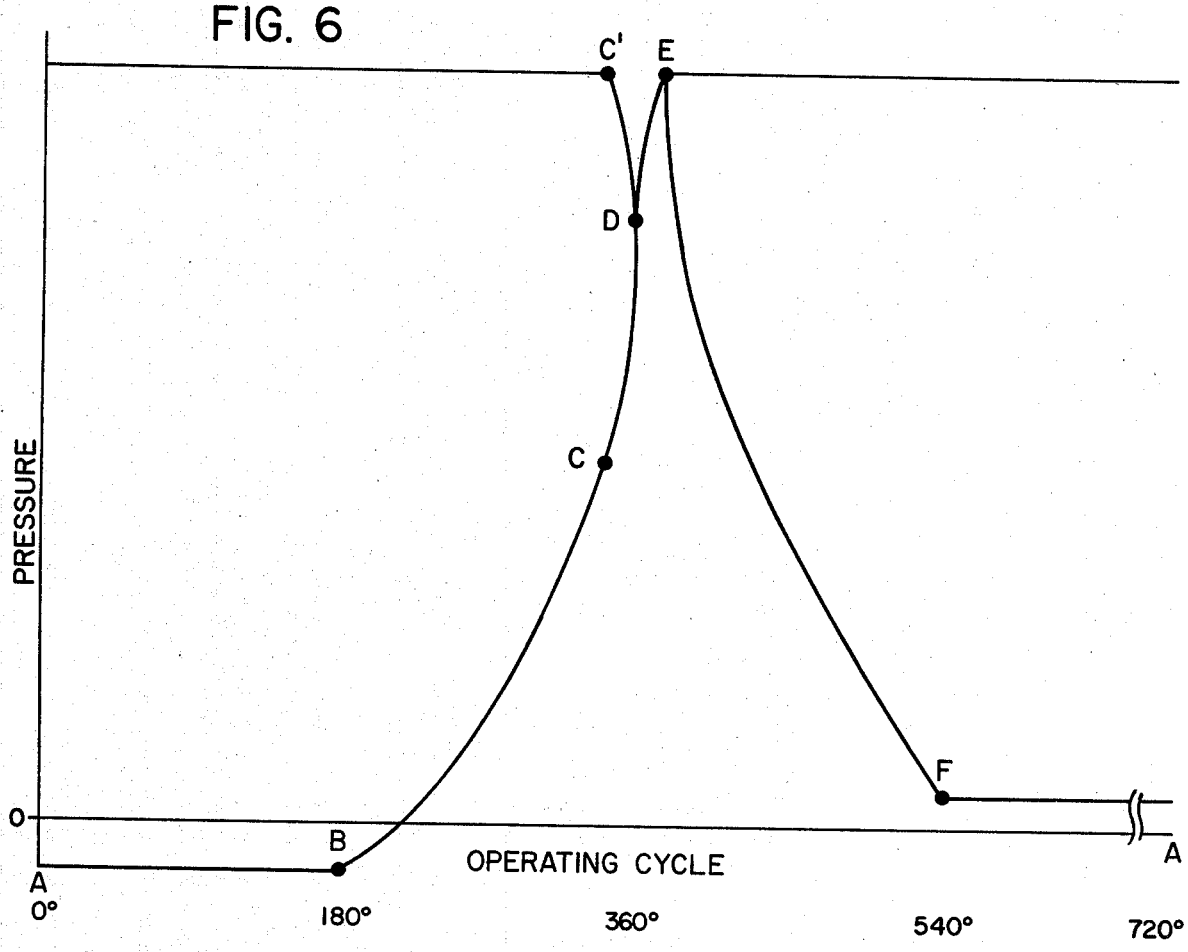
FIG. 6 is a graphic representation, similar to FIG. 5, of the relative pressures within the fuel chamber and a cylinder of a four stroke engine.

FIG. 6 illustrates an operating cycle of a cylinder of a four stroke engine. From A to B fresh air is sucked into the cylinder through an inlet valve, at subatmospheric pressure. This air is compressed during the compression stroke B to C. From C to E the port 82 opens the fuel chamber to the cylinder, whereupon a hot mixture of air and fuel flows from the fuel chamber to the cylinder and burns, from C' to D. At point D the pressures in the fuel chamber and cylinder become equal. However, during continued combustion the pressure continues to increase from D to E, where the temperature and pressure in the fuel chamber are restored. This combustion drives the piston inward in the power stroke, from E to F. The exhaust valve associated with the cylinder now opens to exhaust the spent gases of combustion, from F to A, at slightly superatmospheric pressure.

From the foregoing description, it will be apparent that the engine of this invention may have but a single cylinder, or as many cylinders as desired. With a single cylinder, each combustion provides the fuel chamber with additional high pressure hot gases by which to initiate the next cycle of operation of the same cylinder. With a plurality of cylinders, combustion in one cylinder provides the fuel chamber with additional high pressure hot gases by which to initiate operation of the next cylinder in the operation sequence. Although starting by means of air or steam under pressure is preferred, crank or other forms of starting may be utilized, as desired.

It will be understood that various modifications and changes may be made in the size, shape, type, number and arrangement of parts described hereinbefore. For example, the clamp band 54 illustrates a simple phasing arrangement which requires that the engine be at standstill for phase adjustment. Accordingly, it is preferred that well known mechanism be provided to permit adjusting the phasing of the distribution valve disc 80 while the engine is in operation. This provides means to select direction of rotation upon starting and, after starting, to adjust the phase for best performance. This and other changes may be made without departing from the spirit of this invention and the scope of the appended claims.

Having now described my invention and the manner in which it may be used, I claim:

1. In an internal combustion engine having at least one cylinder, a respective piston reciprocative in each cylinder in a compression stroke and a power stroke, and means communicating with each cylinder for introducing combustion air thereto prior to said power stroke and for exhausting combustion gases therefrom after said power stroke, the combination therewith of
   (a) a fuel chamber,
   (b) a fuel passageway communicating each cylinder with the fuel chamber,
   (c) a fuel supply conduit communicating at one end with the fuel chamber and arranged for communication at its opposite end with a source of combustible fuel under pressure greater than the combustion pressure within each cylinder,
   (d) movable distribution valve means associated with the fuel passageways for opening and closing communication between the fuel chamber and each cylinder in a repetitive sequence,
   (e) the distribution valve means being operable to communicate each cylinder with the fuel chamber during a period when said respective piston is nearing the end of the compression stroke and starting the power stroke for a time sufficient to allow flow of fluid retained in the fuel chamber to the cylinder, ignition to start substantially when the fluid meets the combustion air from the cylinder, and subsequently flow of a portion of resulting combustion gases from the cylinder to the fuel chamber which is retained within the fuel chamber to maintain a temperature above ignition and a pressure above that of the cylinder until communication with a succeeding cylinder cycle of operation so as to promote sustained combustion of the succeeding cylinder cycle of operation,
   and
   (f) a starter means associated with the cylinder and distribution valve means being operable prior to said sustained combustion to move the respective piston in a power stroke direction for initiating starting of said engine.

2. The combination of claim 1 wherein said starter means includes a gaseous starter fluid supply conduit communicating at one end with the fuel chamber and arranged for communication at its opposite end with a source of gaseous starter fluid under pressure sufficient to drive the respective a piston.

3. The combination of claim 1 including electric ignition means communicating with at least one of the cylinders for igniting a mixture of combustible fuel and combustion air.

4. The combination of claim 1 wherein the engine has a power output shaft, and coupling means operatively interengages the output power shaft and the distribution valve means for moving the latter by movement of the power shaft.

5. The combination of claim 1 including phase adjusting means operatively interengaging the respective piston and the distribution valve means for maintaining communication between each cylinder and the fuel chamber at selected positions of the respective piston with respect to its maximum compression position.

6. The combination of claim 1 wherein the engine has a plurality of cylinders, the distribution valve means comprises a rotary disc having a distribution port therethrough disposed off center with respect to its axis of rotation, and the fuel passageways are arranged in circumferentially spaced apart position for selective registration with said distribution port during rotation of the disc.

7. The combination of claim 6 wherein the fuel passageways and distribution port are arranged such that the port overlaps each adjacent pair of fuel passageways during rotation of the disc.

8. The combination of claim 1 wherein the engine has a plurality of cylinders arranged at circumferentially spaced positions about a common central axis, an output power shaft is disposed on said common central axis for axial rotation, and a swash plate is connected to the output power shaft, and a piston rod interconnects each piston and the swash plate.

9. The combination of claim 8 including antitorque arm means interconnecting the swash plate and engine for preventing rotation of the swash plate about the axis of the output power shaft.

10. The combination of claim 1 wherein the engine has a plurality of cylinders, an output power shaft is disposed for axial rotation, the fuel chamber is disposed on said axis of rotation, the distribution valve means comprises a rotary disc in the fuel chamber having a distribution port therethrough disposed off center with respect to its axis of rotation, the fuel passageways are arranged in circumferentially spaced apart position for selective registration with said distribution port during rotation of the disc, the output power shaft and the rotary disc are coupled together for rotating the disc by the output power shaft, wherein said starter means includes a gaseous starter fluid supply conduit which communicates at one end with the fuel chamber and is arranged for communication at its opposite end with a source of gaseous starter fluid under pressure sufficient to drive respective piston.

11. The combination of claim 10 including phase adjusting means operatively interengaging the pistons and the rotary disc for maintaining communication between each cylinder and the fuel chamber at selected positions of the associated piston with respect to its maximum compression position.

* * * * *